(12) United States Patent
Shen et al.

(10) Patent No.: US 11,581,133 B2
(45) Date of Patent: Feb. 14, 2023

(54) INTER-LAYER TRANSITION FORMING MACHINE FOR WINDING OF LARGE-SIZED SUPERCONDUCTING COILS

(71) Applicant: Hefei Institutes of Physical Science, Chinese Academy of Sciences, Anhui (CN)

(72) Inventors: Xing Shen, Anhui (CN); Wei Wen, Anhui (CN); Jin Chen, Anhui (CN); Yuntao Song, Anhui (CN); Kun Lu, Anhui (CN); Weiyue Wu, Anhui (CN)

(73) Assignee: Hefei Institutes of Physical Science, Chinese Academy of Sciences, Hefei (CN)

( * ) Notice: Subject to any disclaimer, the term of this patent is extended or adjusted under 35 U.S.C. 154(b) by 761 days.

(21) Appl. No.: 16/553,002

(22) Filed: Aug. 27, 2019

(65) Prior Publication Data

US 2021/0065976 A1    Mar. 4, 2021

(51) Int. Cl.
*B23P 19/00* (2006.01)
*H05K 13/04* (2006.01)
*H01F 41/04* (2006.01)

(52) U.S. Cl.
CPC .................... *H01F 41/048* (2013.01)

(58) Field of Classification Search
CPC ............................ H01F 6/065; H01F 41/048
See application file for complete search history.

(56) References Cited

FOREIGN PATENT DOCUMENTS

| CN | 1707708 B | 4/2010 | | |
|---|---|---|---|---|
| CN | 108461277 | 8/2018 | | |
| CN | 108597850 A | * 9/2018 | ............ | G21B 1/057 |
| CN | 106356692 | 10/2018 | | |
| JP | 2016149509 | 8/2016 | | |

* cited by examiner

*Primary Examiner* — Paul D Kim

(57) ABSTRACT

The present invention discloses an inter-layer transition forming machine for winding of a large-sized superconducting coil. A vertically movable forming mechanism and a horizontally movable forming mechanism are mounted on a fixing plate. When the winding of a large-sized superconducting coil performs inter-layer transition, an armored superconducting conductor is clamped by wedge clamping mechanisms with right- and left-handed threads on the vertically movable forming mechanism and the horizontally movable forming mechanism, and a reference line on the conductor is ensured to be aligned with a reference line on a forming mold. The vertically movable forming mechanism is pressed down, under the drive of a double-acting hydraulic cylinder, in a vertical direction to form inter-layer transition, and the horizontally movable forming mechanism moves in a horizontal direction according to the reduction of the vertically movable forming mechanism.

7 Claims, 2 Drawing Sheets

INTER-LAYER TRANSITION FORMING MACHINE FOR WINDING OF LARGE-SIZED SUPERCONDUCTING COILS

TECHNICAL FIELD

The present invention relates to superconducting coil forming machines, and in particular to an inter-layer transition forming machine for winding of a large-sized superconducting coil.

BACKGROUND OF THE PRESENT INVENTION

Thermonuclear fusion will provide inexhaustible clean energy for humans. The international thermonuclear experimental reactor (ITER) program will be completed in the next decade. Superconducting magnets provide a required magnetic field for a tokamak, in order to control and constrain high temperature plasma.

The poloidal field coil, as one of main magnets of the tokamak superconducting magnet, is used to control the shape of plasma and stabilize the morphology of plasma. Limited by the manufacturing of conductors, the length of a single superconducting conductor is often less than 1 km. In order to manufacture superconducting coils with large ampere-turns, large-scale nuclear fusion poloidal field superconducting coils are usually designed in a double-pancake structure, and two conductors are connected by a joint between the double pancakes to compensate for insufficient length of a single conductor. The inter-layer transition formation in the double pancakes is an important part of conductor bending, and is also the key to realize transition of the pancake coil from a lower layer to an upper layer. At present, in China, there is no high-precision forming device which can achieve this technical purpose and which is compact in structure and convenient to operate. In view of the state in the prior art, an inter-layer transition forming machine for winding of a large-sized superconducting coil, which is compact in structure, convenient to operate and reliable in formation, provides a mature and feasible solution.

SUMMARY OF THE PRESENT INVENTION

An objective of the present invention is to provide an inter-layer transition forming machine for winding of a large-sized superconducting coil, in order to realize accurate and reliable formation of inter-layer transition of a coil.

For this purpose, the present invention employs the following technical solutions.

Provided is an inter-layer transition forming machine for winding of a large-sized superconducting coil, comprising a fixing plate that is low on a left side and high on a right side;

a vertically movable forming mechanism arranged on the left side of the fixing plate; and a horizontally movable forming mechanism arranged on the right side of the fixing plate, wherein:

the vertically movable forming mechanism comprises a first linear guide rail arranged in a Y-direction, i.e., an up-down vertical direction, of the fixing plate; a vertically movable fixing plate is mounted, in a slide manner, on the first linear guide rail; a first limit plate is fixed to a lower end of the vertically movable fixing plate in the Y-direction, and a first conductor clamping plate is fixed to a portion of the vertically movable fixing plate above the first limit plate in the Y-direction; a first forming mold is mounted, in a slide manner, on the vertically movable fixing plate between the first conductor clamping plate and the first limit plate in the Y-direction; a first screw with right- and left-handed threads, with a central axis in an X-direction, is mounted in a rotatable manner in a gap between the first forming mold and the first conductor clamping plate; two ends of the first screw with right- and left-handed threads go out from ends of the gap between the first forming mold and the first conductor clamping plate, and a first wedge nut with right- and left-handed threads is mounted at each of two ends of the first screw with right- and left-handed threads; a slot is formed respectively at an end of the first forming mold and an end of the first conductor clamping plate which are in the same direction, and the slots form a first wedge slot which allows the first wedge nut with right- and left-handed threads in a corresponding direction to be embedded; the first forming mold, the first conductor clamping plate, the first screw with right- and left-handed threads, and the first wedge nut with right- and left-handed threads form a first wedge clamping mechanism with right- and left-handed threads in the vertically movable forming mechanism; a hydraulic cylinder connection plate is fixed to a portion of the vertically movable fixing plate above the first conductor clamping plate in the Y-direction; a double-acting hydraulic cylinder is mounted on a portion of the fixing plate above the first linear guide rail in the Y-direction, and a piston rod of the double-acting hydraulic cylinder is fixed to the hydraulic cylinder connection plate in the Y-direction; a steel ruler, which is in the Y-direction, is arranged on the fixing plate on a left side or a right side of the hydraulic cylinder connection plate; a travel indicator, which points to the steel ruler, is connected to the hydraulic cylinder connection plate; and a first inter-layer transition position reference line is further provided on a left side of a gap between the first forming mold and the first limit plate of the left side of the fixing plate;

the horizontally movable forming mechanism comprises a second linear guide rail arranged in an X-direction, i.e., a left-right horizontal direction, of the fixing plate; a horizontally movable fixing plate is mounted, in a slide manner, on the second linear guide rail; a second limit plate is fixed to an upper end of the horizontally movable fixing plate in the Y-direction, and a second conductor clamping plate is fixed to a portion of the horizontally movable fixing plate below the second limit plate in the Y-direction; a second forming mold is mounted, in a slide manner, on the horizontally movable fixing plate between the second limit plate and the second conductor clamping plate in the Y-direction; a second screw with right- and left-handed threads, with a central axis in the X-direction, is mounted in a rotatable manner in a gap between the second forming mold and the second conductor clamping plate; two ends of the second screw with right- and left-handed threads go out from respective ends of the gap between the second forming mold and the second conductor clamping plate, and a second wedge nut with right- and left-handed threads is mounted at each of two ends of the second screw with right- and left-handed threads in threaded manner; a slot is formed respectively at an end of the second forming mold and an end of the second conductor clamping plate which are in the same direction, and the slots form a second wedge slot which allows the second wedge nut with right- and left-handed threads in a corresponding direction to be embedded; the second forming mold, the second conductor clamping plate, the second screw with right- and left-handed threads, and the second wedge nut with right- and left-handed threads form a second wedge clamping mechanism with right- and left-handed threads in the horizontally movable forming mechanism; and a second inter-layer transition position reference line is further provided on a right side of a gap between the second forming mold and the second limit plate; and when the winding of a large-sized superconducting coil performs inter-layer transition, an armored superconducting conductor is clamped on the first and second limit plates by the first and second wedge clamping mechanisms with right- and left-handed threads on the vertically movable forming mechanism and the horizontally movable forming mechanism, and a reference line on the conductor is ensured to be aligned with reference lines on the first and second forming molds; and under drive of the double-acting hydraulic cylinder, the vertically movable forming mechanism is pressed down in a vertical direction to form an inter-layer transition, and the horizontally movable forming mechanism moves in a horizontal direction according to reduction of the vertically movable forming mechanism.

A vertically movable forming mechanism limit block is arranged at a middle of a lower end in the Y-direction of the first linear guide rail of the vertically movable forming mechanism on the left side of the fixing plate.

A horizontally movable forming mechanism limit block is arranged at a middle of a left end in the X-direction of the second linear guide rail of the horizontally movable forming mechanism on the right side of the fixing plate.

The fixing plate is in a broken-line shape instead of a coil curve shape, in order to decrease the difficulty in processing the fixing plate and increase structural stiffness; and the first and second inter-layer transition position reference lines are formed on the fixing plate according to a shape of the inter-layer transition, which is configured to online detect whether the inter-layer transition meets tolerance requirement or not.

In the vertically movable forming mechanism, during the formation of the inter-layer transition, the conductor is clamped by the first wedge clamping mechanism with right- and left-handed threads and the reference line on the conductor is ensured to be aligned with the reference line on the first forming mold; a travel indicator is mounted on the hydraulic cylinder connection plate; under the drive of the double-acting hydraulic cylinder, the vertically movable fixing plate moves vertically along the first linear guide rail; and the vertically movable fixing plate stops moving when the travel indicator reaches a predetermined position.

In the horizontally movable forming mechanism, during the formation of the inter-layer transition, the conductor is clamped by the second wedge clamping mechanism with right- and left-handed threads and the reference line on the conductor is ensured to be aligned with the reference line on the forming mold; and when the vertically movable forming mechanism moves in the vertical direction, the horizontally movable forming mechanism moves in the horizontal direction according to the reduction of the vertically movable forming mechanism.

After the inter-layer transition is formed according to a predetermined reduction, the double-acting hydraulic cylinder is driven to move upward, and the clamping mechanism of the vertically movable forming mechanism is released so that the conductor is in a free state, and a distance between an upper surface of the conductor and the first inter-layer transition position reference line on the fixing plate is measured by an angle square and a Vernier caliper; when the measured distance meets the tolerance requirement, the formation of inter-layer transition is considered to be qualified; if the measured distance is too large, the double-acting hydraulic cylinder is driven to move upward and the conductor is corrected, until the measured distance meets the tolerance requirement when the conductor is in the free state; and when the measured distance is too small, the reduction is increased in multiple times with a slight amount each time until the measured distance meets the tolerance requirement.

The inter-layer transition forming machine for winding of a large-sized superconducting coil of the present invention works at normal temperature, is applicable to large-sized superconducting coil production lines to realize the formation of inter-layer transition during the winding of a superconducting coil. The inter-layer transition forming machine for winding of a large-sized superconducting coil of the present invention has great application value in the fusion reactor field and the superconducting field.

In fact, reference may be made to the technical solutions of the present invention if it is expected to realize formation of inter-layer transition during the winding of a superconducting coil. However, any simple modifications, or equivalent changes or variations, made to the structure in accordance with the technical essence of the present invention without departing from the content of the technical solutions of the present invention shall fall into the scope of the technical solutions of the present invention.

The present invention has the following advantages:

the inter-layer transition forming machine of the present invention is complex in function, although simple in both structure and principle, thereby ensuring the smooth and reliable formation of inter-layer transition during the winding of a superconducting coil; the functions are implemented by different units; the fixation plate is a carrier for mounting other mechanisms, and its broken-line structure simplify the curve shape; by the double-acting hydraulic cylinder, the vertically movable forming mechanism moves in the vertical direction; and the vertically movable forming mechanism and the horizontally movable forming mechanism realize the reliable and accurate clamping of the conductor and the smooth formation of inter-layer transition.

DETAILED DESCRIPTION OF THE PRESENT INVENTION

Figure 1:
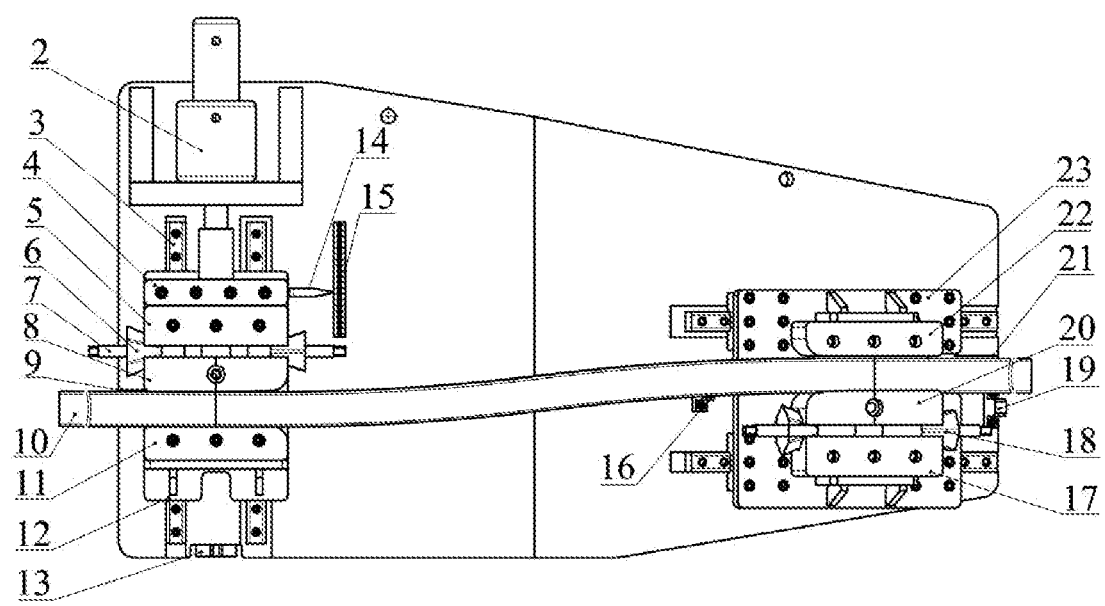
FIG. 1 is a side view of an inter-layer transition forming mechanism according to the present invention.
Figure 2:
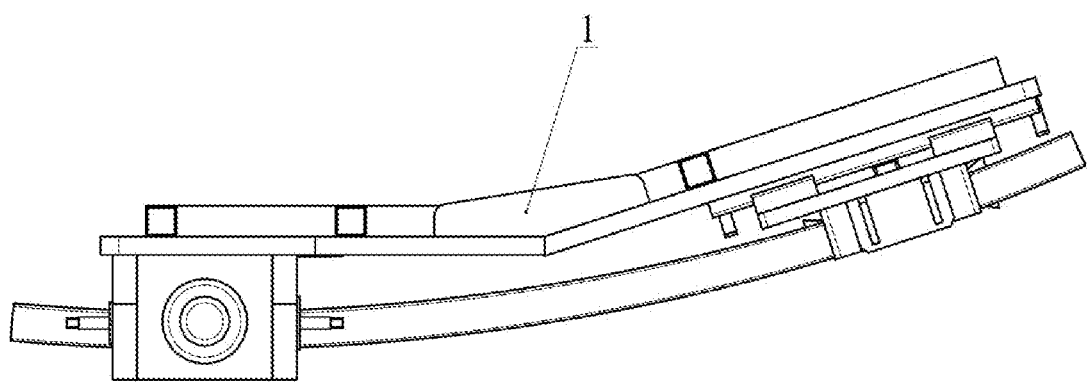
FIG. 2 is a top view of the inter-layer transition forming mechanism according to the present invention.

As shown in FIGS. 1 and 2, an inter-layer transition forming machine for winding of a large-sized superconducting coil comprises a fixing plate 1 that is low on a left side and high on a right side, a vertically movable forming mechanism arranged on the left side of the fixing plate 1, and a horizontally movable forming mechanism arranged on the right side of the fixing plate 1.

The vertically movable forming mechanism comprises a first linear guide rail 3 arranged in a Y-direction, i.e., an up-down vertical direction, of the fixing plate 1; a vertically movable fixing plate 12 is mounted, in a slide manner, on the first linear guide rail 3; a first limit plate 11 is fixed to a lower end of the vertically movable fixing plate 12 in the Y-direction, and a first conductor clamping plate 5 is fixed to a portion of the vertically movable fixing plate 12 above the first limit plate 11 in the Y-direction; a first forming mold 8 is mounted, in a slide manner, on the vertically movable fixing plate 12 between the first conductor clamping plate 5 and the first limit plate 11 in the Y-direction; a first screw 7 with right- and left-handed threads, with a central axis in an X-direction, is mounted in a rotatable manner in a gap between the first forming mold 8 and the first conductor clamping plate 5; two ends of the first screw 7 with right- and left-handed threads go out from respective ends of the gap between the first forming mold 8 and the first conductor clamping plate 5, and a first wedge nut 6 with right- and left-handed threads is mounted at each of the two ends of the first screw 7 with right- and left-handed threads; a slot is formed respectively at an end of the first forming mold 8 and an end of the first conductor clamping plate 5, which are in the same direction, and the slots form a first wedge slot which allows the first wedge nut 6 with right- and left-handed threads in a corresponding direction to be embedded; the first forming mold 8, the first conductor clamping plate 5, the first screw 7 with right- and left-handed threads, and the first wedge nut 6 with right- and left-handed threads form a first wedge clamping mechanism with right- and left-handed threads in the vertically movable forming mechanism; a hydraulic cylinder connection plate 4 is fixed to a portion of the vertically movable fixation plate 12 above the first conductor clamping plate 5 in the Y-direction; a double-acting hydraulic cylinder 2 is mounted in a portion of the fixing plate 1 above the first linear guider ail in the Y-direction, and a piston rod of the double-acting hydraulic cylinder 2 is fixed to the hydraulic cylinder connection plate 4 in the Y-direction; a steel ruler 15, which is in the Y-direction, is arranged on the fixing plate 1 on the left side or right side of the hydraulic cylinder connection plate 4; a travel indicator 14, which points to the steel ruler 15, is connected to the hydraulic cylinder connection plate 4; and a first inter-layer transition position reference line 9 is further provided on a left side of a gap between the first forming mold 8 and the first limit plate 11 of the left side of the fixing plate 1.

The horizontally movable forming mechanism comprises a second linear guide rail arranged in an X-direction, i.e., a left-right horizontal direction, of the fixing plate 1; a horizontally movable fixing plate 23 is mounted, in a slide manner, on the second linear guide rail; a second limit plate 22 is fixed to an upper end of the horizontally movable fixing plate 23 in the Y-direction, and a second conductor clamping plate 17 is fixed to a portion of the horizontally movable fixing plate 23 below the second limit plate 22 in the Y-direction; a second forming mold 20 is mounted, in a slide manner, on the horizontally movable fixing plate 23 between the second limit plate 22 and the second conductor clamping plate 17 in the Y-direction; a second screw with right- and left-handed threads, with the central axis in the X-direction, is mounted in a rotatable manner in a gap between the second forming mold 20 and the second conductor clamping plate 17; two ends of the second screw with right- and left-handed threads go out from respective ends of the gap between the second forming mold and the second conductor clamping plate, and a second wedge nut with right- and left-handed threads is mounted at each of the two ends of the second screw with right- and left-handed threads in threaded manner; a slot is formed respectively at an end of the second forming mold 20 and an end of the second conductor clamping plate 17 which are in the same direction, and the slots form a second wedge slot which allows the second wedge nut with right- and left-handed threads in a corresponding direction to be embedded; the second forming mold 20, the second conductor clamping plate 17, the second screw with right- and left-handed threads, and the second wedge nut with right- and left-handed threads form a second wedge clamping mechanism 18 with right- and left-handed threads in the horizontally movable forming mechanism; and a second inter-layer transition position reference line 21 is also formed on the right side of the fixing plate 1, which is located right to a gap between the second forming mold 20 and the second limit plate 22.

When the winding of a large-sized superconducting coil performs inter-layer transition, an armored superconducting conductor is clamped on the first and second limit plates by the first and second wedge clamping mechanisms with right- and left-handed threads on the vertically movable forming mechanism and the horizontally movable forming mechanism, and a reference line on the conductor is ensured to be aligned with a reference line on a first forming mold; and the vertically movable forming mechanism is pressed down, under drive of a double-acting hydraulic cylinder, in the vertical direction to form an inter-layer transition, and the horizontally movable forming mechanism moves in the horizontal direction according to reduction of the vertically movable forming mechanism.

A vertically movable forming mechanism limit block 13 is arranged at a middle of a lower end in the Y-direction of the first linear guide rail 3 in the vertically movable forming mechanism on the left side of the fixing plate 1.

A horizontally movable forming mechanism limit block 16 is arranged at the middle of a left end in the X-direction of the second linear guide rail in the horizontally movable forming mechanism on the right side of the fixing plate 1.

The fixing plate 1 is in a broken-line shape instead of a coil curve shape, in order to decrease the difficulty in processing the fixing plate and increase the structural stiffness; and the first and second inter-layer transition position reference lines 9, 21, which is configured to online detect whether the inter-layer transition meets the tolerance requirement or not, are formed on the fixing plate 1 according to a shape of the inter-layer transition.

In the vertically movable forming mechanism, during the formation of the inter-layer transition, the conductor 10 is clamped by the first and second wedge clamping mechanisms with right- and left-handed threads and the reference line on the conductor 10 is ensured to be aligned with the reference line on the forming mold; a travel indicator 14 is mounted on the hydraulic cylinder connection plate 4; the vertically movable fixing plate 12 moves vertically, under the drive of the double-acting hydraulic cylinder 2, along the first linear guide rail 3; and the vertically movable fixing plate 12 stops moving when the travel indicator 14 reaches a predetermined position.

In the horizontally movable forming mechanism, during the formation of the inter-layer transition, the conductor is clamped by the second wedge clamping mechanism 18 with right- and left-handed threads and the reference line on the conductor 10 is ensured to be aligned with the reference line on the forming mold; and when the vertically movable forming mechanism moves in the vertical direction, the horizontally movable forming mechanism moves in the horizontal direction according to the reduction of the vertically movable forming mechanism.

After the inter-layer transition is formed according to a predetermined reduction, the double-acting hydraulic cylinder 2 is driven to move upward, the clamping mechanism of the vertically movable forming mechanism is released so that the conductor 10 is in a free state, and a distance between an upper surface of the conductor 10 and the inter-layer transition position reference line on the fixing plate 1 is measured by an angle square and a Vernier caliper; the formation of inter-layer transition is considered to be qualified, when the measured distance meets the tolerance requirement; if the measured distance is too large, it is necessary to drive the double-acting hydraulic cylinder 2 to move upward and correct the conductor 10, until the measured distance when the conductor 10 is in the free state meets the tolerance requirement; and when the measured distance is too small, it is necessary to increase, in multiple times and with a slight amount every time, the reduction until the measured distance meets the tolerance requirement.

The present invention comprises the broken-line fixing plate 1 on which the double-acting hydraulic cylinder 2, the linear guide rail 3, the vertically movable forming mechanism limit block 13, the steel ruler 15, and the horizontally movable forming mechanism limit blocks 16 and 19 are mounted. The double-acting hydraulic cylinder 2 is connected to the hydraulic cylinder connection plate 4 of the vertically movable forming mechanism by bolts. Inter-layer transition position reference lines 9 and 21 are also formed on the fixing plate.

The vertically movable forming mechanism comprises the hydraulic cylinder connection plate 4, the conductor clamping plate 5, the wedge nut 6 with right- and left-handed threads, the first screw 7 with right- and left-handed threads, the forming mold 8, the limit plate 11, the vertically movable fixing plate 12, etc. The travel indicator 14 is mounted on the hydraulic cylinder connection plate.

The horizontally movable forming mechanism comprises the horizontally movable fixing plate 23, the conductor clamping plate 17, the wedge clamping mechanism with right- and left-handed threads, the forming mold 20, the limit plate 22, etc.

The vertically movable forming mechanism and the horizontally movable forming mechanism are connected to the fixing plate by the linear guide rail 3.

The inter-layer transition formation process will be described below:

1) the double-acting hydraulic cylinder 2 is started and the travel indicator 14 of the vertically movable forming mechanism is zeroed;

2) the wedge clamping mechanism with right- and left-handed threads in the vertically movable forming mechanism is locked to clamp the conductor 10, and the reference line on the conductor is ensured to be aligned with the reference line on the forming mold 8;

3) the wedge clamping mechanism with right- and left-handed threads in the horizontally movable forming mechanism is locked to clamp the conductor 10, and the reference line on the conductor is ensured to be aligned with the reference line on the forming mold 20;

4) the double-acting hydraulic cylinder is started to move the vertically movable forming mechanism downward, until the travel indicator 14 reaches a predetermined position;

5) the double-acting hydraulic cylinder is started to move the vertically movable forming mechanism upward, until the conductor is in the free state;

6) the wedge clamping mechanism with right- and left-handed threads in the vertically movable forming mechanism is unlocked to release the conductor 10;

7) a distance between the upper surface at the left end of the conductor 10 and the inter-layer transition position reference line 9 on the fixing plate 1 is measured by the angle square and a Vernier caliper;

the formation of inter-layer transition is considered to be qualified, when the measured distance in the step 7) meets the tolerance requirement;

when the measured distance in the step 7) is too small, it is necessary to gradually increase the reduction and repeat steps 2) to 7), until the measured distance meets the tolerance requirement; and when the measured distance in the step 7) is too large, it is necessary to start the double-acting hydraulic cylinder to gradually move upward, with a slight amount every time, and measure, when the conductor is in the free state, the distance between the upper surface at the left end of the conductor 10 and the inter-layer transition position reference line 9 on the fixing plate 1, until the measured distance meets the tolerance requirement.

We claim:

1. An inter-layer transition forming machine for winding of a large-sized superconducting coil, comprising:
    a fixing plate that is low on a left side and high on a right side;
    a vertically movable forming mechanism arranged on the left side of the fixing plate; and
    a horizontally movable forming mechanism arranged on the right side of the fixing plate, wherein:
    the vertically movable forming mechanism comprises a first linear guide rail arranged in a Y-direction of the fixing plate; a vertically movable fixing plate is mounted, in a slide manner, on the first linear guide rail; a first limit plate is fixed to a lower end of the vertically movable fixing plate in the Y-direction, and a first clamping plate is fixed to a portion of the vertically movable fixing plate above the first limit plate in the Y-direction; a first forming mold is mounted, in a slide manner, on the vertically movable fixing plate between the first clamping plate and the first limit plate in the Y-direction; a first screw with right- and left-handed threads, with a central axis in an X-direction, is mounted in a rotatable manner in a gap between the first forming mold and the first clamping plate; two ends of the first screw with right- and left-handed threads go out from ends of the gap between the first forming mold and the first clamping plate, and a first wedge nut with right- and left-handed threads is mounted at each of two ends of the first right- and left-handed screw in threaded manner; a slot is formed respectively at an end of the first forming mold and an end of the first clamping plate which are in the same direction, and slots form a first wedge slot which allows the first wedge nut with right- and left-handed threads in a corresponding direction to be embedded; the first forming mold, the first clamping plate, the first screw with right- and left-handed threads, and the first wedge nut with right- and left-handed threads form a first wedge clamping mechanism with right- and left-handed threads in the vertically movable forming mechanism; a hydraulic cylinder connection plate is fixed to a portion of the vertically movable fixing plate above the first clamping plate in the Y-direction; a double-acting hydraulic cylinder is mounted on a portion of the fixing plate above the first linear guide rail in the Y-direction, and a piston rod of the double-acting hydraulic cylinder is fixed to the hydraulic cylinder connection plate in the Y-direction; a steel ruler, which is in the Y-direction, is arranged on the fixing plate on a left side or a right side of the hydraulic cylinder connection plate; a travel indicator, which points to the steel ruler, is connected to the hydraulic cylinder connection plate; and a first inter-layer transition position reference line is further provided on a left side of a gap between the first forming mold and the first limit plate of the left side of the fixing plate;

the horizontally movable forming mechanism comprises a second linear guide rail arranged in an X-direction of the fixing plate; a horizontally movable fixing plate is mounted, in a slide manner, on the second linear guide rail; a second limit plate is fixed to an upper end of the horizontally movable fixing plate in the Y-direction, and a second clamping plate is fixed to a portion of the horizontally movable fixing plate below the second limit plate in the Y-direction; a second forming mold is mounted, in a slide manner, on the horizontally movable fixing plate between the second limit plate and the second clamping plate in the Y-direction; a second screw with right- and left-handed threads, with a second central axis in the X-direction, is mounted in a rotatable manner in a gap between the second forming mold and the second clamping plate; two ends of the second screw with right- and left-handed threads go out from ends of the gap between the second forming mold and the second clamping plate, and a second wedge nut with right- and left-handed threads is mounted at each of the two ends of the second screw with right- and left-handed threads in threaded manner; a slot is formed respectively at an end of the second forming mold and an end of the second clamping plate which are in the same direction, and slots form a second wedge slot which allows the second wedge nut with right- and left-handed threads in a corresponding direction to be embedded; the second forming mold, the second clamping plate, the second screw with right- and left-handed threads, and the second wedge nut with right- and left-handed threads form a second wedge clamping mechanism with right- and left-handed threads in the second horizontally movable forming mechanism; and a second inter-layer transition position reference line is further provided on a right side of a gap between the second forming mold and the second limit plate; and when the winding of the large-sized superconducting coil performs an inter-layer transition, an armored superconducting conductor is clamped on the first and second limit plates by the first and second wedge clamping mechanisms with right- and left-handed threads on the vertically movable forming mechanism and the horizontally movable forming mechanism, and reference lines on the armored superconducting conductor are ensured to be aligned with reference lines on the first and second forming molds; and under drive of the double-acting hydraulic cylinder, the vertically movable forming mechanism is pressed down in a vertical direction to form an inter-layer transition, and the horizontally movable forming mechanism moves in a horizontal direction according to reduction of the vertically movable forming mechanism.

2. The inter-layer transition forming machine of claim 1, further comprising a vertically movable forming mechanism limit block arranged at a middle of a lower end in the Y-direction of the first linear guide rail of the vertically movable forming mechanism on the left side of the fixing plate.

3. The inter-layer transition forming machine of claim 1, further comprising a horizontally movable forming mechanism limit block arranged at a middle of a left end in the X-direction of the second linear guide rail of the horizontally movable forming mechanism, on the right side of the fixing plate.

4. The inter-layer transition forming machine of claim 1, wherein the fixing plate is in a broken-line shape instead of a coil curve shape, in order to decrease the difficulty in processing the fixing plate and increase structural stiffness; and the first and second inter-layer transition position reference lines are formed on the fixing plate according to a shape of the inter-layer transition, which is configured to online detect whether the inter-layer transition meets a tolerance requirement or not.

5. The inter-layer transition forming machine of claim 1, wherein, in the vertically movable forming mechanism, during the formation of the inter-layer transition, the armored superconducting conductor is clamped by the first wedge clamping mechanism with right- and left-handed threads and the reference line on the armored superconducting conductor is ensured to be aligned with the reference line on the first forming mold; a travel indicator is mounted on the hydraulic cylinder connection plate; under the drive of the double-acting hydraulic cylinder, the vertically movable fixing plate moves vertically along the first linear guide rail; and the vertically movable fixing plate stops moving when the travel indicator reaches a predetermined position.

6. The inter-layer transition forming machine of claim 1, wherein, in the horizontally movable forming mechanism, during the formation of the inter-layer transition, the armored superconducting conductor is clamped by the second wedge clamping mechanism with right- and left-handed threads and the reference line on the armored superconducting conductor is ensured to be aligned with the reference line on the second forming mold; and when the vertically movable forming mechanism moves in the vertical direction, the horizontally movable forming mechanism moves in the horizontal direction according to reduction of the vertically movable forming mechanism.

7. The inter-layer transition forming machine of claim 1, wherein, after the inter-layer transition is formed according to a predetermined reduction, the double-acting hydraulic cylinder is driven to move upward, and the first clamping mechanism of the vertically movable forming mechanism is released so that the armored superconducting conductor is in a free state, and a distance between an upper surface of the armored superconducting conductor and the first inter-layer transition position reference line on the fixing plate is measured by an angle square and a Vernier caliper; when the measured distance meets the tolerance requirement, the formation of the inter-layer transition is qualified; if the measured distance is too large, the double-acting hydraulic cylinder is driven to move upward and the armored superconducting conductor is corrected, until the measured distance meets the tolerance requirement when the armored superconducting conductor is in the free state; and when the measured distance is too small, the reduction is increased multiple times with a slight amount each time, until the measured distance meets the tolerance requirement.

* * * * *